(No Model.)

J. F. KOMP.
MACHINE FOR BRAZING BAND SAWS.

No. 252,605. Patented Jan. 24, 1882.

Witnesses.
H. M. Matthews
Samuel Kerr

Inventor
John F. Komp
per Edward A. Dicker
his attorney

N. PETERS, Photo-Lithographer, Washington, D. C.

UNITED STATES PATENT OFFICE.

JOHN F. KOMP, OF CHICAGO, ILLINOIS.

MACHINE FOR BRAZING BAND-SAWS.

SPECIFICATION forming part of Letters Patent No. 252,605, dated January 24, 1882.

Application filed January 11, 1881. (No model.)

*To all whom it may concern:*

Be it known that I, JOHN F. KOMP, a citizen of the United States, residing at Chicago, in the county of Cook and State of Illinois, have invented a new and useful Machine for Brazing Band-Saws, of which the following is a specification.

My invention relates to an improvement in a machine or apparatus for brazing band-saws; and the objects of my invention are, first, to confine the heat at the point where the saw is to be repaired in a box, with a slot in which the two ends of the saw are inserted; second, to hold the two ends of the saw to be repaired in position by means of clamps and thumb-screws attached to a cast-iron box. I have preferred to attain these objects by the following mechanism, illustrated in the accompanying drawings, in which—

Figure 1:
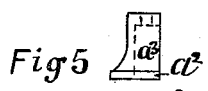
Figure 1:
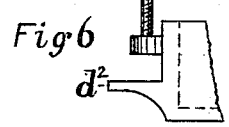
Figure 1:
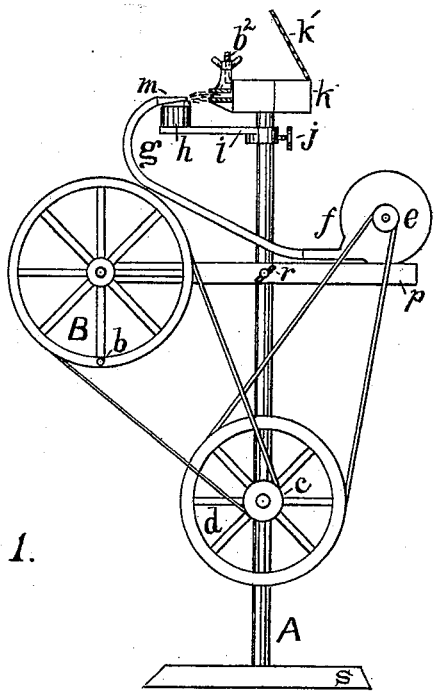
Figure 2:
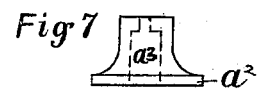
Figure 2:
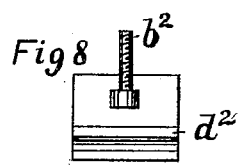
Figure 2:
Figure 3:
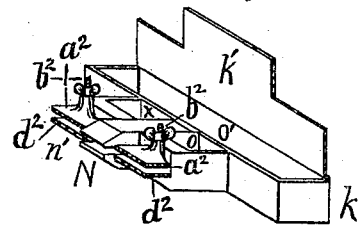

Figure 1 is a side view of the entire machine; Fig. 2, a sectional view of the box containing charcoal, in which the heat is confined; Fig. 3, a detailed sectional view, in perspective, of the box in which the heat is confined and the clamps for holding the ends of the saw in position, and also box containing compartments for holding files, wire, borax, &c.; Figs. 4, 5, and 6, detailed sectional views of one of the clamps for holding the ends of the saw in position, and its support; Figs. 7 and 8, front views of one of the clamps, screws, and its support.

Similar letters refer to similar parts throughout the several views.

The perpendicular shaft or standard A, (see Fig. 1,) supported at the base by legs, or the plate $s$ and the cross-piece P, constitute the frame-work of the machine, the cross-piece P passing around the standard A, and being attached to it by a thumb-screw, so that it can be raised or lowered for the purpose of tightening the belts on wheels B, $d$, and $e$. The wheel B, Fig. 1, on the cross-piece P, being turned by the crank $b$, drives, with the belt on the pulley $c$, the wheel $d$, which in turn drives the pulley $e$, turning the fan in box $f$, thus making a blast through the tube or hose $g$ at the nozzle $m$.

On top of the standard A is placed the iron box K, and attached thereto by a screw passing through the box into the standard A, the box K being divided into compartments O, O', and $x$, (see Fig. 3,) all covered by the lid K'.

Attached to the front of each of the smaller compartments of the box K (see Fig. 3) is a thumb-screw, $b^2$, and clamp $a^2$, the bottom of the box K being prolonged, $d^2$, (see Figs. 3, 6, and 8,) and the screw $b^2$ passing through the opening $a^3$ in clamp $a^2$. (See Figs. 5 and 7.)

Between the clamps $a^2 a^2$ (see Fig. 3) is placed the box $n$, (which I prefer to make of cast-iron,) resting on the bottom of the box K, and not attached in any way, but fitting in between the two smaller compartments of box K, the box $n$ having slot $n'$ in front and open at the back, (see Fig. 2,) and a block of common charcoal, $n^2$, or other similar substance, inserted, the slot $n'$, when the box $n$ is placed in position, being on a line with $d^2$, Fig. 6.

The ends of the saw to be repaired are brought together in the slot $n'$ in box $n$ (see Fig. 3) and held in position by the clamps $a^2 a^2$, the ends of the saw resting on $d^2$, Fig. 6, the clamp $a^2$, Fig. 5, being screwed down on screw $b^2$, Fig. 6, by the thumb-piece shown in Fig. 4. Just below the box K, on the standard A, is a bracket, $i$, attached and held in position on the standard A by a sleeve encircling standard A, and a thumb-screw, on which is the lamp $h$, with the wick directly in front of the slot $n'$ in box $n$, (see Fig. 1,) burning kerosene, alcohol, or other similar substance. If desired, gas could be used instead of the lamp. The nozzle $m$ on the tube or hose $g$ passing over the lamp $h$, and attached to it, (see Fig. 1,) the heat is forced by the blast into the slot $n'$ in box $n$, and being confined there by the charcoal, an intense heat is brought upon the ends of the saw in the slot $n'$ and the brazing is accomplished almost instantly. When the charcoal is consumed or partially consumed by repeatedly being used, the box $n$ can be taken out and a new block of charcoal inserted.

What I claim is—

1. In a machine for brazing band-saws, the box $n$, with slot $n'$, containing charcoal or other similar substance, for the purpose of confining the heat, in combination with a blow-pipe apparatus, for the purpose specified, substantially as set forth.

2. In a machine for brazing band-saws, the box K, with the clamps $a^2$ $a^2$, in combination with the box $n$, with the slot $n'$, containing charcoal or other similar substance, substantially as set forth, for the purpose specified.

3. In a machine or apparatus for brazing or soldering, the combination of a bed-plate, K, and means for maintaining the articles to be brazed in proper relative position upon the bed-plate of a charcoal-receptacle, $n$, whereby the articles to be brazed may be embedded in charcoal to co-operate with a flame in heating the soldering material.

JOHN F. KOMP.

Witnesses:
H. M. MATTHEWS,
SAMUEL KERR.